US012139645B2

(12) United States Patent
Hoch et al.

(10) Patent No.: US 12,139,645 B2
(45) Date of Patent: Nov. 12, 2024

(54) POLYCHLOROPRENE-BASED CONTACT ADHESIVES CONTAINING ETHYLENE-VINYL ACETATE COPOLYMER

(71) Applicant: ARLANXEO DEUTSCHLAND GMBH, Dormagen (DE)

(72) Inventors: Martin Hoch, Shanghai (CN); Christian Lente, Dormagen (DE); Regina Friese, Dormagen (DE); Martin Schneider, Dormagen (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 1114 days.

(21) Appl. No.: 16/961,461

(22) PCT Filed: Jan. 11, 2018

(86) PCT No.: PCT/CN2018/072278
§ 371 (c)(1),
(2) Date: Jul. 10, 2020

(87) PCT Pub. No.: WO2019/136671
PCT Pub. Date: Jul. 18, 2019

(65) Prior Publication Data
US 2021/0087437 A1 Mar. 25, 2021

(51) Int. Cl.
C09J 111/00 (2006.01)
C09J 5/00 (2006.01)

(52) U.S. Cl.
CPC ............... *C09J 111/00* (2013.01); *C09J 5/00* (2013.01); *C09J 2411/00* (2013.01); *C09J 2423/04* (2013.01); *C09J 2427/008* (2013.01); *C09J 2431/00* (2013.01)

(58) Field of Classification Search
CPC .. C09J 111/00; C09J 123/0853; C08F 279/02; C08L 11/00; C08L 23/0853; C08L 31/04
USPC ........................................................ 524/519
See application file for complete search history.

(56) References Cited

U.S. PATENT DOCUMENTS

| | | | | |
|---|---|---|---|---|
| 3,506,630 A | * | 4/1970 | Gerhard | C08F 10/00 526/915 |
| 6,440,259 B1 | | 8/2002 | Patel | |
| 7,488,770 B2 | | 2/2009 | Wantanabe et al. | |
| 7,589,146 B2 | | 9/2009 | Yashima et al. | |
| 7,964,662 B2 | | 6/2011 | Freund et al. | |
| 2003/0100665 A1 | * | 5/2003 | Oba | C08L 11/02 524/834 |
| 2005/0182173 A1 | | 8/2005 | Yashima et al. | |
| 2007/0043165 A1 | | 2/2007 | Wantanabe et al. | |
| 2007/0251640 A1 | | 11/2007 | Freund et al. | |

FOREIGN PATENT DOCUMENTS

| | | | | |
|---|---|---|---|---|
| CA | 994931 A | | 8/1976 | |
| CA | 2151228 A1 | | 12/1995 | |
| CN | 1367810 A | | 9/2002 | |
| CN | 1646618 A | * | 7/2005 | ............. C08L 11/02 |
| CN | 1788028 A | | 6/2006 | |
| CN | 101454417 A | | 6/2009 | |
| CN | 103275649 A | | 9/2013 | |
| CN | 103468156 A | | 12/2013 | |
| CN | 103571382 A | | 2/2014 | |
| CN | 105038654 A | | 11/2015 | |
| DE | 2159124 A1 | | 5/1972 | |
| EP | 0686655 A1 | | 12/1995 | |
| GB | 1072691 A | | 6/1967 | |
| JP | H 11147288 A | | 6/1999 | |
| JP | 2004359788 A | | 12/2004 | |
| KR | 20140134888 A | | 11/2014 | |
| WO | WO-2017100085 A1 | * | 6/2017 | ............. B32B 13/12 |

OTHER PUBLICATIONS

Polychloroprene Contact Adhesives. ASI Adhesives & Sealants Industry. https://www.adhesivesmag.com/articles/85273-polychloroprene-contact-adhesives. Mar. 4, 2003. (Year: 2003).*
De Silva et al., "Improvements in Performance of Polychloroprene Rubber Based Adhesives"; Journal of Rubber of Sri Lanka, 2001, 84; pp. 50-62.
Guggenberger, "Neoprene (Polychloroprene)-Based Solvent andn Latex Adhesives", Skeist ed., Handbook of Adhesives, NY 1990, pp. 284-306.
Technical Information Bulletin; No. 1.2.2; Sep. 1980; "Solvents for Baypren", Raw Materials for Adhesives.
Ullman's Encyclopedia of Industrial Chemistry, "Phenolic Resins", vol. 26, pp. 591-593; 2011.
Ullman's Encyclopedia of Industrial Chemistry, 7th Edition, vol. 31, pp. 501-502; 2011.
Ullman's Encyclopedia of Industrial Chemistry, 7th Edition, vol. 31; "Synthesis of Polymer Modification", pp. 489-491; 2011.
International Preliminary Report on Patentability issued in corresponding application PCT/CN2018/072278 Jul. 14, 2020.
International Search Report and Written Opinion issued in crresponding application PCT/CN2018/072278 mailed Sep. 27, 2018.

(Continued)

*Primary Examiner* — Stephen E Rieth
(74) *Attorney, Agent, or Firm* — Norris McLaughlin, P.A.

(57) ABSTRACT

Contact adhesive compositions comprising polychloroprene and, based on the polychloroprene content, 10 to 99 wt % of ethylene-vinyl acetate copolymer exhibit outstanding adhesion to substrates such as ethylene-vinyl acetate copolymers, thermoplastic elastomers or flexible PVC. The contact adhesive compositions of the invention are especially suitable for use in the bonding of articles, preferably articles in which at least part of the articles to be bonded consists of polyurethane, flexible PVC, ethylene-vinyl acetate copolymers and/or thermoplastic elastomers. This allows the adhesive composition to be employed widely in the footwear industry, for the bonding of roofing membranes containing flexible PVC, ethylene-propylene-diene rubber (EPDM) and/or ethylene-vinyl acetate copolymers, or for the bonding of synthetic leather based on flexible PVC.

13 Claims, No Drawings

(56) References Cited

Müller B. Rath W. Hannover, 2004, pp. 52-56 (English language translation also provided).
RÖMPP Chemie Lexikon, vol. 6, 9th edition, 1992, Eds. Jürgen Falbe, Manfred Regitz, Terpene Phenolic Resins, p. 4510 (English language translation also provided).
RÖMPP Chemie Lexikon, vol. 1, 9th edition, 1989, Eds. Jürgen Falbe, Manfred Regitz, Chlorinated Rubbers, p. 704 (English language translation also provided).
RÖMPP Chemie Lexikon, vol. 3, 8th edition, 1983, Ed. Otto-Albrecht Neumüller, Silicas, pp. 2108-2109 (English language translation also provided).

* cited by examiner

POLYCHLOROPRENE-BASED CONTACT ADHESIVES CONTAINING ETHYLENE-VINYL ACETATE COPOLYMER

This application is a 371 of PCT/CN2018/072278, filed Jan. 11, 2018, the disclosures of which are incorporated herein by reference.

Solvent-based contact adhesives with polychloroprene as their basis are notable for high initial strength, long contact bonding time, good tack and autoadhesion, and also for resistance to oils, chemicals, water and also ozone. They have therefore been established for many years in applications within the footwear, furniture, construction and automotive industries. The footwear industry in particular is reliant on contact adhesives, which allow rapid and reliable bonds, with long working times (contact bonding times), and therefore permit a high production rate. The requirements made of these adhesives within the footwear industry are continually rising. As well as easy-to-bond materials such as synthetic rubber and leather, there is increased use of difficult-to-bond materials such as ethylene-vinyl acetate copolymers, thermoplastic elastomers or flexible polyvinyl chloride (flexible PVC). Flexible PVC is understood to be polyvinyl chloride (PVC) having a plasticizer content of at least 20%. The repair of footwear items in particular relies on having a universal adhesive available that enables bonds of all of the stated materials.

In the use of contact adhesives, the adhesive is applied to both adherends. After the minimum drying time has expired, the time within which the major part of the solvent evaporates, the adherends are joined within the contact bonding time with as high an applied pressure as possible (contact bonding process). A feature of the contact adhesives is that joining within the contact bonding time produces an immediate bond with high initial strength. When using these adhesives, there is no need for the adherends to be fixed. In an alternative process, the adhesive is applied to both substrates and the solvent is evaporated to the point of complete dryness. The adhesive is subsequently activated by heat (e.g. IR lamp, heating cabinet) or by application of a solvent. Following activation, the adherends can be bonded under high pressure as described above. Where activation takes place by heating of the adhesive, the term used is that of thermal or heat activation.

Commercial, polychloroprene-based, solvent-containing contact adhesives commonly include the following constituents: polychloroprene, resin, magnesium oxide, zinc oxide, ageing inhibitor, solvent (mixture). Typical formulations are described for example in Handbook of Adhesives, Skeist I, Vol. 3, New York, 1990, pp. 284-301, and Formulierung von Kleb-und dichtstoffen, Müller B. Rath W. Hannover, 2004, pp. 52-56. The types of polychloroprene used are predominantly, though not exclusively, types which crystallize rapidly and fairly rapidly.

Examples of resins used include alkyl-phenolic resins (cf. Ullmanns Encyclopädie der technischen Chemie, Wolfgang Hesse, Jürgen Lang, 2011, Phenolic Resins, Vol. 26, p. 591), terpene phenolic resins (cf. RÖMPP Chemie Lexikon, Volume 6, 9th edition, 1992, Eds. Jürgen Falbe, Manfred Regitz, Terpene Phenolic Resins, p. 4510), coumarone-indene resins (cf. "Ullmanns Encyclopädie der technischen Chemie" Gerd Collin, Rolf Mildenberg, Mechtild Zander, Hartmut Höke, William McKillip, Werner Freitag, Wolfgang Imöhl, 2011, Resins Synthetic, Vol. 31, p. 501), α-methylstyrene resins (cf. Ullmanns Encyclopädie der technischen Chemie, Gerd Collin, Rolf Mildenberg, Mechtild Zander, Hartmut Höke, William McKillip, Werner Freitag, Wolfgang Imöhl, 2011, Resins Synthetic, Vol. 31, pp. 501-502) or resin acid esters (cf. Ullmanns Encyclopädie der technischen Chemie, Klemens Fiebach, Dieter Grimm, 2011, Resins Natural, Vol. 31, pp. 489-491).

Further possible constituents may be, for example, chlorinated rubber (cf. RÖMPP Chemie Lexikon, Volume 1, 9th edition, 1989, Eds. Jürgen Falbe, Manfred Regitz, Chlorinated Rubbers, p. 704), Silica, RÖMPP Chemie Lexikon, Volume 3, 8th edition, 1983, Ed. Otto-Albrecht Neumüller, Silicas, pp. 2108 ff) and fillers such as calcium carbonate.

In connection with the present invention, the term polychloroprene refers to polymers obtainable by emulsion polymerization of chloroprene (2-chloro-1,3-butadiene) alone or together with other monomers copolymerizable with chloroprene, such as, for example, 2,3-dichloro-1,3-butadiene, 1-chloro-1,3-butadiene, 1,3-butadiene, isoprene, acrylic acid, methacrylic acid, acrylonitrile, methacrylonitrile, sulfur and styrene. The fraction of these comonomers is typically not more than 25, preferably not more than 20, more preferably not more than 15 and most preferably not more than 10%, based on the total mass of the copolymer.

The preparation of polychloroprene is a long-established procedure. It is accomplished by radical emulsion polymerization in the alkaline aqueous medium, and predominantly at temperatures of 10° C. to 45° C. The polymerization temperature has an influence on the microstructure of the resultant polymer. The lower the polymerization temperature, the higher the fraction of monomer units which are incorporated in trans configuration into the chain. The higher the proportion of monomer units in trans configuration, the higher the crystallization tendency of the polychloroprene.

The polymerization is halted at conversions of between 60% and 100%, and unconverted monomers are removed by devolatilization. To isolate the solid, the dispersion is first adjusted to a pH of 5.5-7.0 by addition of dilute acetic acid. The polychloroprene is recovered subsequently by deposition on the dispersion on a chilled roll (about −15° C.) (freeze coagulation). The thin, frozen polychloroprene layer is thawed, washed, dried, gathered to form a strand and chopped into chips. Polychloroprene finds use in applications including rubber articles, and also in contact adhesives and sealants.

Suitable solvents for polychloroprene and the resins are typically organic solvents and mixtures thereof and are described in Baypren technical information bulletins, 1.2.2 Solvents for Baypren, Bayer, 1980. They are, for example, chlorinated or unhalogenated aliphatic, aromatic or aliphatic-aromatic hydrocarbons, ketones, esters, alcohols or ethers. Used with preference are toluene, xylene, cyclohexane, petroleum spirit, acetone, 2-butanone, ethyl acetate, propyl acetate and butyl acetate. The amounts of solvent or solvent mixture used are for example between 60-95 wt %, preferably 65-90 wt %, more preferably 70-85 wt %, based on the adhesive composition. Ageing inhibitors used are predominantly sterically hindered phenols such as Vukanox BHT, for example.

Adhesive composition based on ingredients described above can be used as one-component adhesives in the contact bonding process. To increase the heat stability and attachment to substrates that are difficult to bond, the adhesives may be used in the form of two-component adhesives. EP686655A1 used an isocyanate-based crosslinker as a second component. The crosslinker consists of a di- or polyisocyanate such as, for example, Desmodur RE, Desmodur RFE, Desmodur RC, diphenylmethane 4,4'-diisocyanate (MDI), hexamethylene 1,6-diisocyanate (HDI), toluene 2,4-diisocyanate (TDI), isophorone diisocyanate (IPDI).

Adhesives described above are suitable for the bonding of a multiplicity of substrates, such as wood, metal, leather or rubber.

A disadvantage of such adhesive compositions, however, is the poor adhesion to substrates such as ethylene-vinyl acetate copolymers, thermoplastic elastomers or flexible PVC. For the bonding of such materials, the Handbook of Adhesives, Skeist I, Vol. 3, New York, 1990, p. 289 and J. Rubber Res. Inst. Sri Lanka, de Silva et al., 84, 50-62, 2001 recommend a contact adhesive composition which contains not polychloroprene as such but rather a polychloroprene-polymethyl methacrylate graft copolymer. For the grafting reaction, the polychloroprene is dissolved in organic solvents and methyl methacrylate is grafted on radically at 70-90° C. A commonly used initiator is benzoyl peroxide. In order to prevent gelling, the reaction is halted at a conversion of around 40%. In the completed adhesive composition, this leads to a residual methyl methacrylate content of up to 5 percent by weight, which irritates the respiratory pathways and is also classified as irritant and sensitizing to the skin. The grafting reaction is a time-consuming operation inevitably involving operation with environmentally hazardous, potentially explosive, irritant and sensitizing substances. The finished product possesses an additional risk to the user as a result of the presence of the methyl methacrylate. JP2004359788 describes an adhesive composition which consists of a mixture of a polychloroprene-polymethyl methacrylate graft copolymer and an ethylene-vinyl acetate copolymer-polymethyl methacrylate graft copolymer. The mixture is prepared by a grafting reaction of methyl methacrylate in a solution of ethylene-vinyl acetate copolymers and polychloroprene. The completed adhesive exhibits good bond strength on ethylene-vinyl acetate copolymers.

Disadvantages here as well, however, are the contamination with unconverted methyl methacrylate and also the additional operating step of the grafting reaction.

It was an object of the present invention to provide a polychloroprene-based contact adhesive which is easy to prepare, which is suitable for the bonding of flexible PVC and which is free from methyl methacrylate.

The expression "free from methyl methacrylate" should be interpreted in connection with the present invention to mean that the monomeric methyl methacrylate content of the composition is less than 2, preferably less than 1, more preferably less than 0.1 and most preferably less than 0.01 wt %.

In one preferred interpretation, the expression means that the contact adhesive compositions of the invention are, moreover, free from methyl acrylate, i.e., the monomeric methyl acrylate content of the composition is less than 2, preferably less than 1, more preferably less than 0.1 and most preferably less than 0.01 wt %.

In one especially preferred interpretation, the expression means that the contact adhesive compositions of the invention contain overall less than 2, preferably less than 1, more preferably less than 0.1 and most preferably less than 0.01 wt % of copolymerized methyl methacrylate and methyl acrylate.

Surprisingly it has been found that the object can be achieved by doing largely or entirely without the use of polychloroprene-polymethyl methacrylate graft copolymers and instead using polychloroprene and ethylene-vinyl acetate copolymer as components of the adhesive composition.

An ethylene-vinyl acetate copolymer is understood to be a copolymer containing repeating units derived from ethylene and vinyl acetate, it being possible for there to be up to 20 wt %, preferably up to 15 wt %, more preferably up to 10 wt %, with further preference up to 5 wt % and most preferably no repeating units present that derive from monomers copolymerizable with ethylene and vinyl acetate. Examples of such comonomers are acrylates, methacrylates and vinyl esters. The term "ethylene-vinyl acetate copolymers" in connection with the present invention typically does not encompass ethylene-vinyl acetate copolymers having grafted-on polymer units.

The production of the adhesive composition of the invention is therefore simplified in the sense that no grafting reaction is required and the blending of the composition can be carried out in a simple stirring vessel.

In the present invention, the terms "adhesive" and "adhesive composition" are used synonymously.

The use of ethylene-vinyl acetate copolymers in solvent-containing contact adhesives based on polychloroprene was hitherto unknown. GB1072691A and DE2159124A1 describe the use of ethylene-vinyl acetate copolymers and polychloroprene in pressure-sensitive adhesives ((PSAs), or pressure-sensitive self-adhesive compositions). Pressure-sensitive adhesives differ fundamentally from contact adhesives in that they consist of pastes with permanent viscosity. The disadvantage of these adhesive compositions is that at room temperature they are viscous (tacky) and therefore have only a low cohesive strength. Contact adhesives, in contrast, contain constituents which are solid at room temperature and which are applied in solution or dispersion in a solvent or dispersion medium respectively. Following application and in the bondline, the contact adhesives are solid at service temperature and therefore have a high cohesive strength. The solvents used in GB1072691A serve merely as auxiliaries to the production of the pressure-sensitive adhesive. When the pressure-sensitive adhesive is used, however, it is free from solvents and inherently is viscous (tacky). This distinguishes it from the contact adhesives, which are used as solvent-based adhesives. CN103275649A, CN103468156A, CN103571382A and CN105038654A describe the use of polychloroprene in hot-melt adhesives based on ethylene-vinyl acetate copolymers. Hot-melt adhesives differ fundamentally from the contact adhesives described in the present application in that they contain no solvents or dispersion media. For the application of hot-melt adhesives, elevated temperatures are always necessary, whereas contact adhesives can be worked in a broad temperature range, including room temperature and below.

The object of the invention is achieved by means of a contact adhesive composition comprising polychloroprene and, based on the polychloroprene content, 10 to 99, preferably 15 to 80 and more preferably 30 to 65 wt % of an ethylene-vinyl acetate copolymer. If the proportion of ethylene-vinyl acetate copolymer is too low, a sufficient improvement in the peel strength is not achieved; if the ethylene-vinyl acetate copolymer content is too high, there is a deterioration in miscibility and so phase separation occurs.

In one preferred embodiment the ethylene-vinyl acetate copolymer has an ISO 1133 melt flow index of 2 to 30 g/10 min as measured at 190° C./2.16 kg. Using ethylene-vinyl acetate copolymer with a higher melt flow index may deleteriously influence various properties of the contact adhesive composition.

It has been found that adhesives of the invention can be prepared by using ethylene vinyl acetate copolymers having a vinyl acetate content of 18 to 90 wt %, preferably 25 to 80 wt % and more preferably 35 to 75 wt % in polychloroprene-based, solvent-containing adhesive compositions. Use may be made both of cold-polymerized polychloroprene varieties (polymerization temperature 5-20° C.) and of hot-polymerized varieties (polymerization temperature 20-50° C.), and also mixtures of the varieties. The addition of further constituents such as, among others, resins, metal oxides, chlorinated rubber, silica, and ageing inhibitors, though possible, is not mandatory.

One application form of the adhesive composition may be produced by introducing the solvent or solvent mixture in a stirring vessel and adding the solid constituents with stirring. In an alternative production method, the solid constituents are first masticated on a roll and the rolled sheet is then dissolved in the solvent or solvent mixture.

In one typical application form, the solvent content of the contact adhesive composition is 60-95 wt %, preferably 65-90 wt %, more preferably 70-85 wt %, based on the total amount of the contact adhesive composition.

In one preferred embodiment the contact adhesive composition comprises 60-95 wt %, preferably 65-90 wt %, more preferably 70-85 wt % of solvent, and also a total of 5-40 wt %, preferably 10-35 wt %, more preferably 15-30 wt % of polychloroprene and ethylene-vinyl acetate copolymer, based in each case on the total amount of the contact adhesive composition.

The contact adhesive composition of the invention may comprise, based on the total amount of the contact adhesive composition, 0.1-35 wt %, preferably 1-25 wt %, more preferably 3-15 wt % of further components, preferably selected from resins, magnesium oxide, zinc oxide, silica, isocyanate-based crosslinkers, and ageing inhibitors.

One preferred embodiment of the contact adhesive composition of the invention comprises 0.1 to 20%, preferably 0.5-15 wt %, more preferably 1-10 wt % of silica, based in each case on the total amount of the contact adhesive composition.

One preferred embodiment of the contact adhesive composition of the invention comprises 0.1 to 15%, preferably 0.5-10 wt %, more preferably 1-8 wt % of magnesium oxide and/or zinc oxide, based in each case on the total amount of the contact adhesive composition.

In another embodiment the contact adhesive composition of the invention, based on the total amount of polychloroprene and ethylene-vinyl acetate copolymer, comprises 0.1 to 30%, preferably 0.5-15 wt %, more preferably 1-10 wt % of resin, preferably one or more resins selected from alkyphenolic resins, terpene-phenolic resins, coumarone-indene resins, α-methylstyrene resins and resin acid esters.

The contact adhesive composition of the invention is typically free from methyl methacrylate.

In one embodiment of the invention, the contact adhesive of the invention comprises polychloroprene having a weight-average molecular weight Mw of more than 200,000, preferably more than 250,000, and more preferably between 300,000 and 1,500,000 daltons.

The adhesives of the invention are used in a contact bonding process. Likewise possible is bonding after drying of the adhesive layer and subsequent heat activation.

The adhesive compositions of the invention can be used directly in one-component form or, in order to increase the thermal strength, can be processed as two-component adhesives with di- or polyisocyanates as crosslinkers.

The contact adhesive compositions of the invention are especially suitable for use for the bonding of articles, preferably of articles in which at least part of the articles to be bonded consists of polyurethane rubber, flexible PVC, ethylene-vinyl acetate copolymers and/or thermoplastic elastomers such as, in particular, styrene-butadiene-styrene block copolymers (SBS), styrene-isoprene-styrene block copolymers (SIS), styrene-ethylene-butadiene-styrene block copolymers (SEBS) and thermoplastic polyurethane elastomers (TPU).

The articles to be bonded may be bonded with articles made from the same or from a different material, for which articles coming into consideration are more particularly those consisting at least in part of materials bondable with polychloroprene, more particularly crepe, rubber or leather.

This opens up the possibility, for example, of use in the footwear industry, for the bonding of roofing membranes comprising flexible PVC, ethylene-propylene-diene rubber (EPDM) and/or ethylene-vinyl acetate copolymers, or for the bonding of synthetic leather based on flexible PVC.

The invention relates, moreover, to a method for bonding articles, preferably articles in which at least part of the articles to be bonded consists of polyurethane rubber, flexible PVC, ethylene-vinyl acetate copolymers and/or thermoplastic elastomers, wherein a contact adhesive composition according to one or more of Claims 1 to 6, in solution in a solvent, is applied to the respective surfaces of the articles to be bonded to one another, the solvent is evaporated at least partially by flashing off or under reduced pressure, and then the surfaces covered with the adhesive are pressed against one another.

In this method, typically, the solvent is evaporated at a temperature of between 0° C. and 80° C., preferably between 10 and 60° C., more preferably between 20 and 40° C.

In one preferred embodiment, after the evaporation of the solvent, the adhesive is heat-activated at a temperature of between 40° C. and 100° C., preferably between 50 and 80° C. and more preferably between 60 and 70° C.

A further subject of the invention are the bonded articles obtained by using the contact adhesive compositions of the invention, or by the method of the invention, more particularly footwear items, clothing articles and roof coverings composed of bonded roofing membranes.

EXAMPLES

The invention is elucidated in more detail below with reference to examples:
Production of Specimens and Implementation of the Tensile Peel Test (Based on DIN EN 1392:2006):

The specimens used were composed of polyvinyl chloride with 30% plasticizer fraction (flexible PVC) and with dimensions of 200 mm×30 mm×4 mm. The specimens were abraded three times with a sanding machine (Jet 10-20 plus drum sander) using 80-grade sandpaper, on one side. The test specimens were subsequently trimmed in length to 100 mm×30 mm×4 mm and were degreased by being wiped down with a paper cloth soaked with ethyl methyl ketone.

For bonding by the contact bonding method, the adhesive was applied doubly to the flexible PVC test specimen, leaving 3 cm to the edge free of adhesive. The waiting time between the two applications was 10 min. Pairs of flexible PVC test specimens, 15 minutes after the second application, were placed on top of one another so as to overlap completely with the adhesive-free areas against one another. Immediately thereafter the test specimens were pressed at 0.4 Pa.

For bonding by the heat-activation method, the adhesive was applied doubly to two flexible PVC test specimens, leaving 3 cm to the edge free of adhesive. The waiting time between the two applications was 10 min. The solvent was then flashed off for 24 h. The subsequent heat activation took place in a heating cabinet at 70° C. for 10 min. Pairs of test specimens were placed on top of one another so as to overlap completely with the adhesive-free areas having been in contact, and pressing took place at 0.4 Pa.

For bonding with isocyanate crosslinker, the adhesive composition was admixed with 7.5 parts by weight of Desmodur RFE (based on 100 parts of adhesive), which were stirred in thoroughly. The two-component adhesive was processed within an hour. The adhesive was applied doubly to the flexible PVC test specimen, leaving 3 cm to the edge free of adhesive. The waiting time between the two applications was 10 min. Pairs of flexible PVC test specimens, 15 minutes after the second application, were placed on top of one another so as to overlap completely with the adhesive-free areas having been in contact, and pressing took place at 0.4 Pa.

The T-peel test took place after seven days of storage of the test specimens at 23° C.

For the T-peel test based on DIN EN 1392:2006, the specimens were clamped by the adhesive-free ends into a tensile testing machine from Zwick, ZN005. Testing took place at 23° C. with a velocity of 100 mm/min. The result reported was the average peel force in newtons per millimetre width of specimen. For the calculation of the average peel force, the first 25 mm and the last 25 mm of the travel of the tensile testing machine were not evaluated. In each test series, five specimens were tested, and the average of the five tests was reported as the result.

Weight-average molar masses were determined by gel permeation chromatography. The eluent used was tetrahydrofuran (flow rate: 1.0 mL/min), the column material consisted of styrene-divinylbenzene copolymer, the column temperature was 35° C., and the eluted polymer was detected using a refractive index (RI) detector.

Production of the Adhesive Compositions:

The adhesive compositions were produced in a direct dissolution process. For this process, all of the solid constituents, apart from polychloroprene and the ethylene-vinyl acetate copolymers, were charged to a closable container, the solvents were weighed in, and then the polychloroprene and the ethylene-vinyl acetate copolymer were added. Dissolution took place on a laboratory shaker at 23° C. within 24 h.

Ingredients for the Adhesive Composition:
  Baypren ALX 233-1: polychloroprene (medium-rapid crystallization) from ARLANXEO
  Baypren ALX 320-2 polychloroprene (rapid crystallization) from ARLANXEO
  Escorene Ultra UL 00328: ethylene-vinyl acetate copolymer with 27 wt % vinyl acetate content from Exxon Mobil Chemical
  Levamelt 400: ethylene-vinyl acetate copolymer with 40 wt % vinyl acetate content from ARLANXEO
  Levamelt 450: ethylene-vinyl acetate copolymer with 45 wt % vinyl acetate content from ARLANXEO
  Levamelt 500: ethylene-vinyl acetate copolymer with 50 wt % vinyl acetate content from ARLANXEO
  Levamelt 600: ethylene-vinyl acetate copolymer with 60 wt % vinyl acetate content from ARLANXEO
  Levamelt 700: ethylene-vinyl acetate copolymer with 70 wt % vinyl acetate content from ARLANXEO
  Levamelt 800: ethylene-vinyl acetate copolymer with 80 wt % vinyl acetate content from ARLANXEO
  SP-560: terpene-phenolic resin from SI Group
  SFP-121H: alkyl-phenolic resin from SI Group
  Vulkasil C: precipitated silica from RheinChemie
  Rhenofit D/A: magnesium oxide (MgO) from RheinChemie
  Zinc oxide, active: zinc oxide (ZnO) from LANXESS
  Vulkanox BHT: ageing inhibitor (2,6-di-tert-buty-4-methylphenol) from LANXESS Test Specimens:
  Polyvinyl chloride with 30% plasticizer fraction (flexible PVC) from Rocholl GmbH The tables below set out the formulations and also the peel strengths achieved on flexible PVC. The comparative examples are marked in the tables with a C in front of the experiment number. The inventive examples carry the label I.

TABLE 1.1

Bonding by the method of heat activation without isocyanate crosslinker.
(Quantities in parts by weight per 100 parts of Baypren ALX 320-2)

|  | C1 | I1 | I2 | I3 | I4 | I5 | I6 |
|---|---|---|---|---|---|---|---|
| Baypren ALX 320-2 | 100 | 100 | 100 | 100 | 100 | 100 | 100 |
| SP-560 | 30 | | | | | | |
| Levamelt 400 | | 30 | | | | | |
| Levamelt 450 | | | 30 | | | | |
| Levamelt 500 | | | | 30 | | | |
| Levamelt 600 | | | | | 30 | | |
| Levamelt 700 | | | | | | 30 | |
| Levamelt 800 | | | | | | | 30 |
| MgO | 4 | 4 | 4 | 4 | 4 | 4 | 4 |
| ZnO | 4 | 4 | 4 | 4 | 4 | 4 | 4 |
| Vulkanox BHT | 2 | 2 | 2 | 2 | 2 | 2 | 2 |
| Vulkasil C | 20 | 20 | 20 | 20 | 20 | 20 | 20 |
| Toluene | 463 | 463 | 463 | 463 | 463 | 463 | 463 |
| Ethyl methyl ketone | 100 | 100 | 100 | 100 | 100 | 100 | 100 |
| Peel strength on flexible PVC (N/mm) | 0.21 | 1.98 | 1.96 | 1.96 | 1.41 | 0.80 | 0.46 |

TABLE 1.2

Bonding by the method of heat activation without isocyanate crosslinker.
(Quantities in parts by weight per 100 parts of Baypren ALX 320-2)

|  | C2 | I7 | I8 | I9 | I10 | I11 | I12 |
|---|---|---|---|---|---|---|---|
| Baypren ALX 320-2 | 100 | 100 | 100 | 100 | 100 | 100 | 100 |
| SP-560 |  |  |  |  |  | 15 | 30 |
| Levamelt 600 |  | 15 | 30 | 60 | 90 | 15 | 30 |
| MgO | 4 | 4 | 4 | 4 | 4 | 4 | 4 |
| ZnO | 4 | 4 | 4 | 4 | 4 | 4 | 4 |
| Vulkanox BHT | 2 | 2 | 2 | 2 | 2 | 2 | 2 |
| Toluene | 463 | 463 | 463 | 463 | 463 | 463 | 463 |
| Ethyl methyl ketone | 100 | 100 | 100 | 100 | 100 | 100 | 100 |
| Peel strength on flexible PVC (N/mm) | 0.28 | 0.48 | 1.11 | 2.04 | 2.19 | 0.85 | 1.02 |

TABLE 2

Bonding by the method of contact bonding without heat activation and without isocyanate crosslinker. (Quantities in parts by weight per 100 parts of Baypren ALX 320-2)

|  | C3 | I13 | I14 | I15 |
|---|---|---|---|---|
| Baypren ALX 320-2 | 100 | 100 | 100 | 100 |
| SFP-121 | 30 |  |  |  |
| Levamelt 600 |  | 30 | 30 |  |
| Levamelt 700 |  |  |  | 30 |
| MgO | 4 | 4 | 4 | 4 |
| ZnO | 4 | 4 | 4 | 4 |
| Vulkanox BHT | 2 | 2 | 2 | 2 |
| Vulkasil C |  | 20 |  | 20 |
| Toluene | 463 | 463 | 463 | 463 |
| Ethyl methyl ketone | 100 | 100 | 100 | 100 |
| Peel strength on flexible PVC (N/mm) | 0.19 | 0.80 | 0.65 | 0.63 |

TABLE 3

Bonding by the method of contact bonding without heat activation and with isocyanate crosslinker. (Quantities in parts by weight per 100 parts of polychloroprene (Baypren ALX 320-2 or Baypren ALX 233-1))

|  | C4 | I17 | I18 | I19 | I20 | I21 | I22 | I23 | I24 | I25 |
|---|---|---|---|---|---|---|---|---|---|---|
| Baypren ALX 320-2 | 100 | 100 | 100 | 100 | 100 | 100 | 100 | 100 | 100 |  |
| Baypren ALX 233-1 |  |  |  |  |  |  |  |  |  | 100 |
| SP-560 | 30 |  |  |  |  |  |  |  | 15 |  |
| Escorene 0328 |  | 30 |  |  |  |  |  |  |  |  |
| Levamelt 400 |  |  | 30 |  |  |  |  |  |  |  |
| Levamelt 450 |  |  |  | 30 |  |  |  |  |  |  |
| Levamelt 500 |  |  |  |  | 30 |  |  |  |  |  |
| Levamelt 600 |  |  |  |  |  | 30 |  |  | 15 | 30 |
| Levamelt 700 |  |  |  |  |  |  | 30 |  |  |  |
| Levamelt 800 |  |  |  |  |  |  |  | 30 |  |  |
| MgO | 4 | 4 | 4 | 4 | 4 | 4 | 4 | 4 | 4 | 4 |
| ZnO | 4 | 4 | 4 | 4 | 4 | 4 | 4 | 4 | 4 | 4 |
| Vulkanox BHT | 2 | 2 | 2 | 2 | 2 | 2 | 2 | 2 | 2 | 2 |
| Vulkasil C | 20 | 20 | 20 | 20 | 20 | 20 | 20 | 20 | 20 | 20 |
| Toluene | 463 | 463 | 463 | 463 | 463 | 463 | 463 | 463 | 463 | 463 |
| Ethyl methyl ketone | 100 | 100 | 100 | 100 | 100 | 100 | 100 | 100 | 100 | 100 |
| Peel strength on flexible PVC (N/mm) | 0.28 | 0.45 | 0.97 | 1.60 | 1.42 | 1.94 | 1.50 | 1.31 | 0.81 | 1.72 |

Comparative examples C1-C4 shown in Tables 1.1, 1.2, 2 and 3 represent typical polychloroprene-based formulations according to the prior art. These formulations can be used without problems for the bonding of a multiplicity of materials. As the tables set out above show, however, the formulations are not suitable for the bonding of flexible PVC. The inadequate peel forces arise independently of the mode of processing (heat activation (Tab. 1.1, 1.2), contact method (Tab. 2), isocyanate crosslinking (Tab. 3)). Even a variation in the resin used does not produce any improvement in the peel strength on flexible PVC (Tables 1.1, 1.2, 2 and 3).

Tables 1.1, 1.2, 2 and 3 show that the use of an ethylene-vinyl acetate copolymer in the adhesive composition brings about a significant improvement in the bond strength on flexible PVC. Where ethylene-vinyl acetate copolymers are used, an improvement is achieved in the adhesive properties on flexible PVC (Tab. 1.1). As can be seen from Table 1.2, the amount of ethylene-vinyl acetate copolymer used can be varied over a wide range. The inventive adhesive composition may be admixed, furthermore, with conventional resins, such as, for example, terpene-phenolic resin (Tab. 1.2, 3) or other auxiliaries such as silica (Tab. 1.1, 2 and 3). The improvement in the bonding outcome is achieved not only in the method with heat activation (Tab. 1.1, 1.2) but also in the contact bonding method (Tab. 2). Likewise possible is the use of the inventive adhesive compositions in combination with isocyanate crosslinkers in a two-component process (Tab. 3). Tab. 3 shows, moreover, that the desirably high peel forces on flexible PVC are independent of the molecular structure of the polychloroprene used. Flexible PVC can be bonded not only with rapidly crystallizing varieties but also with those that crystallize with medium rapidity (Table 3, Example 25). The likewise very good adhesive properties of the formulations of the invention on other substrates such as styrene-butadiene rubber, for example, allow this adhesive to be deployed very universally.

The invention claimed is:

1. Contact adhesive composition comprising:
   polychloroprene,
   15 to 90 wt %, based on polychloroprene content, of an ethylene-vinyl acetate copolymer having a vinyl acetate content of 27 to 80 wt %, and
   60-95 wt % of solvent, based on a total weight of the contact adhesive composition,
   wherein the solvent is one or more members selected from the group consisting of organic solvents.

2. Contact adhesive composition according to claim 1, comprising 60-95 wt % of solvent, and also a total of 5-40 wt % of polychloroprene and ethylene-vinyl acetate copolymer, based in each case on the total weight of the contact adhesive composition.

3. Contact adhesive composition according to claim 1, comprising 0.1-35 wt % of further components selected from resins, magnesium oxide, zinc oxide, isocyanate-based crosslinkers, and ageing inhibitors, based on the total weight of the contact adhesive composition.

4. Contact adhesive composition according to claim 1, which is free from methyl methacrylate.

5. Contact adhesive composition according to claim 1, further comprising at least one of terpene phenolic resin, alkyl-phenolic resin, coumarone-indene resin, α-methylstyrene resin, chlorinated rubber, silica, and resin acid esters.

6. Contact adhesive composition according to claim 1, wherein the polychloroprene has a weight-average molecular weight Mw of more than 200,000 daltons.

7. Contact adhesive composition according to claim 1, comprising one or more isocyanate-based crosslinkers selected from di- and polyisocyanates.

8. A method of bonding an article in which at least part of the article to be bonded consists of at least one of polyurethane rubber, flexible PVC, ethylene-vinyl acetate copolymers, and thermoplastic elastomers, said method comprising bonding the articles with a contact adhesive composition according to claim 1.

9. Method according to claim 8, wherein the article is a footwear item.

10. Method according to claim 8, wherein the article is a roofing membrane comprising at least one of flexible PVC, ethylene-propylene-diene rubber, and ethylene-vinyl acetate copolymers, or the article is synthetic leather based on flexible PVC.

11. Method according to claim 8, wherein the contact adhesive composition, in solution in the solvent, is applied to a surface of the article to be bonded to another surface, the solvent is evaporated at least partially by flashing off or under reduced pressure, and then the surface of the article, now covered with the adhesive, is pressed against said another surface.

12. Method according to claim 11, wherein the solvent is evaporated at a temperature of between 0° C. and 80° C.

13. Method according to claim 11, wherein, after the evaporation of the solvent, the adhesive is heat-activated at a temperature of between 40° C. and 100° C.

* * * * *